United States Patent
Shiau et al.

(10) Patent No.: US 8,200,060 B2
(45) Date of Patent: Jun. 12, 2012

(54) BRIGHTNESS ENHANCEMENT SHEET

(75) Inventors: Tzeng-Ke Shiau, Jiangsu (CN); Ching-Shiang Li, Jiangsu (CN); Chao-Hung Weng, Jiangsu (CN); Wei-Chung Chao, Jiangsu (CN)

(73) Assignee: Coretronic Corporation, Hsin-Chu (TW)

( * ) Notice: Subject to any disclaimer, the term of this patent is extended or adjusted under 35 U.S.C. 154(b) by 132 days.

(21) Appl. No.: 12/884,189

(22) Filed: Sep. 17, 2010

(65) Prior Publication Data

US 2011/0176315 A1    Jul. 21, 2011

(30) Foreign Application Priority Data

Jan. 21, 2010   (TW) ................. 99101673 A

(51) Int. Cl.
    *G02B 6/10*  (2006.01)

(52) U.S. Cl. ............ 385/146; 349/56; 349/57; 349/112; 349/113; 349/158

(58) Field of Classification Search .................. 385/146; 349/56, 57, 112, 113, 158; 362/606, 618, 362/626, 97.1
See application file for complete search history.

(56) References Cited

U.S. PATENT DOCUMENTS

| 6,280,063 | B1 * | 8/2001 | Fong et al. ........... 362/333 |
| 6,845,212 | B2 | 1/2005 | Gardiner et al. |
| 7,074,463 | B2 * | 7/2006 | Jones et al. ........... 428/1.1 |
| 7,278,771 | B2 | 10/2007 | Campbell |
| 2008/0088933 | A1 | 4/2008 | Lin |

FOREIGN PATENT DOCUMENTS

| TW | I274896 | 3/2007 |
| TW | 200712655 | 4/2007 |
| TW | 200819855 | 5/2008 |
| TW | I302989 | 11/2008 |
| TW | M352033 | 3/2009 |

* cited by examiner

*Primary Examiner* — Brian M. Healy
*Assistant Examiner* — Mary El Shammaa
(74) *Attorney, Agent, or Firm* — Jianq Chyun IP Office

(57) ABSTRACT

A brightness enhancement sheet including a light transmissive substrate, a plurality of strip prisms, and a plurality of protruding structures is provided. The light transmissive substrate has a first surface and a second surface opposite to the first surface. The strip prisms are disposed on the first surface. Each of the strip prisms has two prism surfaces, and a junction of the two prism surfaces forms a crest line, and a valley line is formed between each of the two adjacent strip prisms. Each of the protruding structures has two wing portions. The two wing portions are respectively disposed on two prism surfaces of the corresponding strip prism. A junction of the two wing portions forms a protruding end. The protruding end protrudes from the crest line of the corresponding strip prism. Each of the wing portions extends from the protruding end to the valley line.

17 Claims, 4 Drawing Sheets

BRIGHTNESS ENHANCEMENT SHEET

CROSS-REFERENCE TO RELATED APPLICATION

This application claims the priority benefit of Taiwan Patent Application serial No. 99101673, filed on Jan. 21, 2010. The entirety of the above-mentioned patent application is hereby incorporated by reference herein and made a part of this specification.

BACKGROUND OF THE INVENTION

1. Field of the Invention

The invention generally relates to an optical film, and more particularly to a brightness enhancement sheet.

2. Description of Related Art

With the advancements in the optoelectronic industries in the recent years, the requirements for the exit beam shape provided by the light source module have gradually increased. Accordingly, various types of optical films have been developed by therequests of the beam shape. The optical films include diffusion sheets and brightness enhancement films (BEFs) such as prism sheets and lens arrays, and other sheets. More specifically, a prism sheet used as a BEF employs the light emitting prism surfaces of a plurality of rod-shaped prisms to select the incident light rays in different entrance directions. Generally, a light beam incident upon the bottom portion of the rod-shaped prisms at an angle of approximately 60° may pass through the prism due to refraction effects of the rod-shaped prisms, and the beam may exit the prism in a direction approximately perpendicular to the bottom portion of the rod-shaped prisms. Moreover, for light beams having incident angles that are significantly larger or smaller than 60°, the beams may not pass through the prisms due to the total reflection effect of the light emitting prism surfaces. These light beams are reflected back towards the optical device located below the prism sheet and reused.

Accordingly, the prism sheet achieves a light condensing effect for configuring the emitted light beams to be substantially forward-emitted.

However, a crest line at the top portion of the rod-shaped prism and a valley line formed between two adjacent rod-shaped prisms are clearly observable and they are disposed at regular intervals. Therefore, a moiré phenomenon is easily formed with a display panel (e.g., a liquid crystal display panel) disposed above the prism sheet or the BEF, thereby affecting the display quality of the display panel. Moreover, the rod-shaped prisms may form a sharp corner at the crest line, and the sharp corner may easily scrape or scratch the adjacent optical device. Additionally, since each of the rod-shaped prisms have the same height, the prism sheet may locally adhere to an adjacent optical film rather easily, thereby causing local abnormalities in the displayed image.

Taiwan Patent No. I302989 provides an optical film having a transparent substrate, a structural layer, and a plurality of light guide units. The structural layer may be a light condensing unit (e.g., a prism structure) disposed on the transparent substrate. The light condensing unit has a peak line and two surfaces. The light guide unit is disposed on the peak line or the two surfaces. The light guide unit may have a tapered shape, a circular arch shape, a circular arc shape or a prism shape.

Furthermore, Taiwan Patent No. M352033 provides an optical film having a microstructure layer, and the microstructure layer is a columnar structure. Taiwan Patent No. I274896 provides a light condensing sheet including a substrate and a plurality of curved combining prism units. Taiwan Patent Publication No. 200712655 provides an optical film with a surface having a plurality of irregular prism blocks. Taiwan Patent Publication No. 200819855 provides an optical film with a surface having a plurality of light guide microstructures, and each of the light guide microstructures has two or above peaks. U.S. Pat. No. 7,278,771 provides an optical film with a surface having curved rod-shaped prism structures. U.S. Pat. No. 6,845,212 provides an optical film with a surface having waved-shape rod-shaped prism structures.

SUMMARY OF THE INVENTION

The invention provides a brightness enhancement film capable of mitigating at least one of a moiré phenomenon, a local adherence phenomenon, a scraping and scratching phenomenon that are generated with other optical devices.

Other objects and advantages of the invention may be further illustrated by the technical features broadly embodied and described as follows.

An embodiment of the invention provides a brightness enhancement sheet including a light transmissive substrate, a plurality of strip prisms, and a plurality of protruding structures. The light transmissive substrate has a first surface and a second surface opposite to the first surface. The strip prisms are disposed on the first surface. Each of the strip prisms has two prism surfaces. A junction of the two prism surfaces forms a crest line, and a valley line is formed between each of the two adjacent strip prisms. The protruding structures are disposed on at least a portion of the strip prisms. Each of the protruding structures has two wing portions, and the two wing portions are respectively disposed on two prism surfaces of the corresponding strip prism. A junction of the two wing portions forms a protruding end protruding from the crest line of the corresponding strip prism. Each of the wing portions extends from the protruding end to the valley line, and each of the wing portions protrudes from the corresponding prism surface and the valley line.

Another embodiment of the invention provides a brightness enhancement sheet, including a light transmissive substrate and a plurality of strip prisms. The light transmissive substrate has a first surface and a second surface opposite to the first surface. The strip prisms are disposed on the first surface. Each of the strip prisms has a crest line rising up and down in a direction close and away from the light transmissive substrate. The crest line rises up and down relative to an extended direction of the strip prisms. Any one of the cross-sections of the strip prisms perpendicular to the extended direction has a curved top portion and two curved sides. A radius of curvature of the curved top portion is not equal to a radius of curvature of the curved sides. Moreover, an average height of the strip prisms in a direction perpendicular to the second surface is at least partially different from another.

In summary, since the brightness enhancement sheet according to an embodiment of the invention has protruding structures protruding from the crest line of the strip prisms, or according to another embodiment, an average height of the strip prisms of the brightness enhancement sheet in a direction perpendicular to the second surface is at least partially different from another, a regularity of the crest line and a height uniformity of the strip prisms may be broken. Accordingly, the moiré phenomenon generated by the brightness enhancement sheet with other optical devices may be reduced, and the local adherence phenomenon produced by the brightness enhancement sheet with other optical devices may also be prevented. Therefore, a light source module adopting the brightness enhancement sheet of embodiments of the invention may provide an uniform surface light source. Moreover, a display apparatus adopting the brightness enhancement sheet of embodiments of the invention may provide a display image with a preferable quality.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
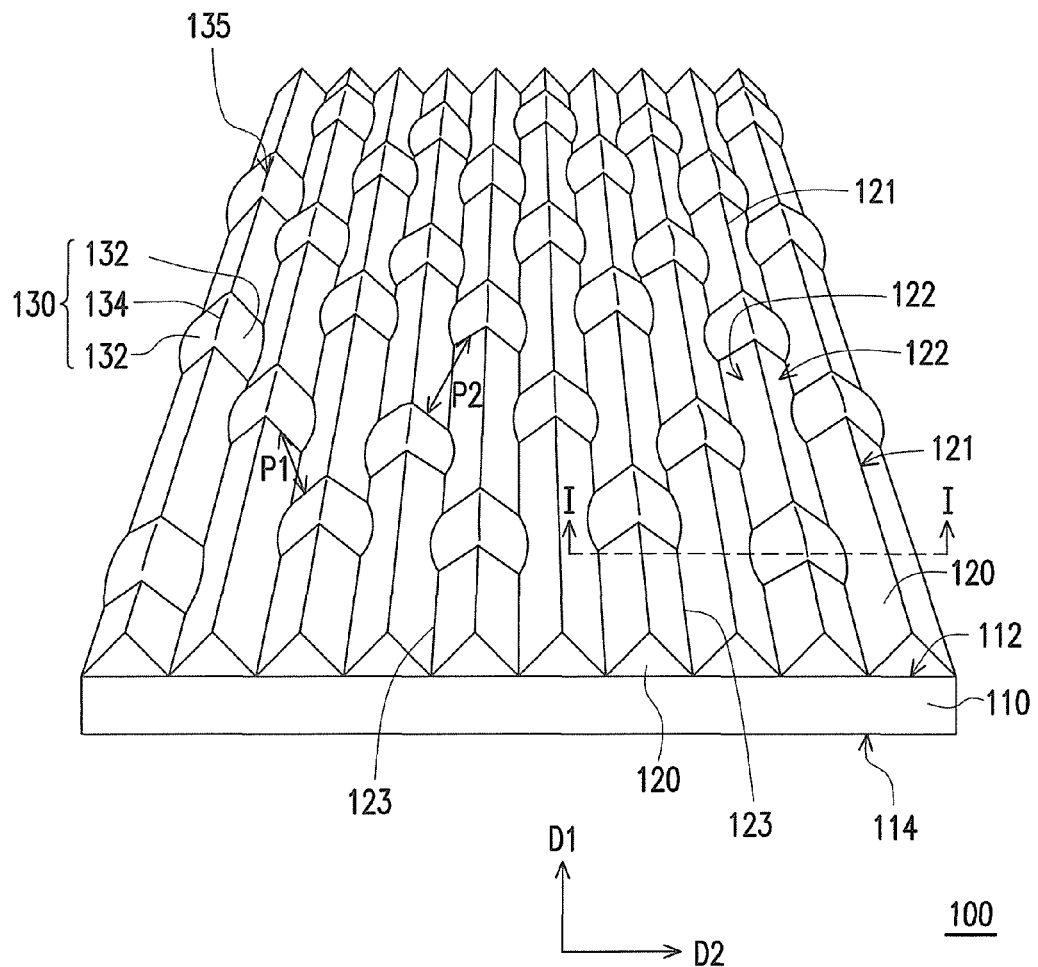
FIG. 1A is a perspective view of a brightness enhancement sheet in accordance with an embodiment of the invention.
Figure 1B:
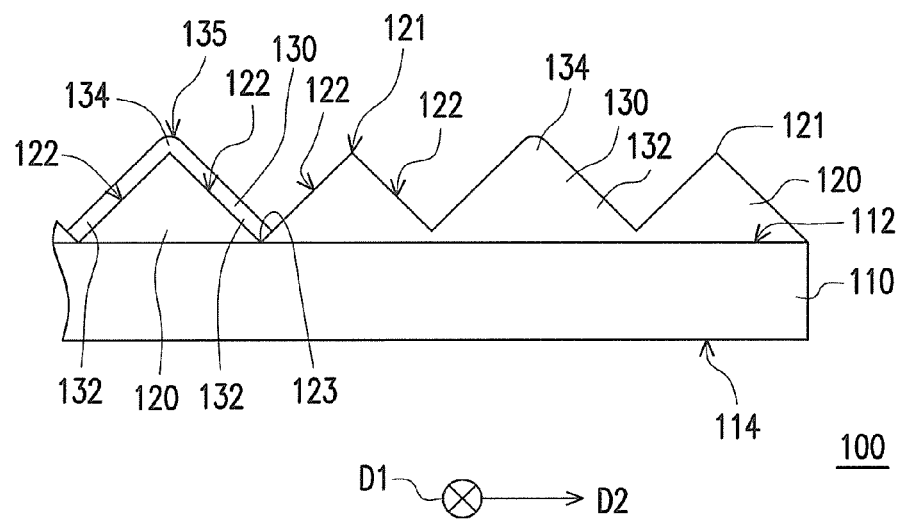
FIG. 1B is a cross-sectional view taken along a line I-I of the brightness enhancement sheet depicted in FIG. 1A.

Referring to FIGS. 1A and 1B, a brightness enhancement sheet 100 of the embodiment may be adopted in a backlight module of a liquid crystal display (LCD) or a light source module, for enhancing the brightness of the light source module or the backlight module. Moreover, the backlight module includes a side type backlight module or a direct type backlight module. The brightness enhancement sheet 100 of the embodiment includes a light transmissive substrate 110, a plurality of strip prisms 120, and a plurality of protruding structures 130. The light transmissive substrate 110 has a first surface 112 and a second surface 114 opposite to the first surface 112. In the embodiment of the invention, the light transmissive substrate 110 is a transparent substrate, for example. The strip prisms 120 are disposed on the first surface 112. In the embodiment, each of the strip prisms 120 extends along a first direction D1, and the strip prisms 120 are arranged along a second direction D2. Moreover, in the embodiment of the invention, the first direction D1 is substantially perpendicular to the second direction D2. Each of the strip prisms 120 has two prism surfaces 122. A junction of the two prism surfaces 122 forms a crest line 121, and a valley line 123 is formed between each of the two adjacent strip prisms 120. In the embodiment, the strip prisms 120 may be transparent prisms, for example.

The protruding structures 130 are disposed on at least a portion of the strip prisms 120. In the embodiment, the protruding structures 130 disposed on all of the strip prisms 120. However, in other embodiments of the invention, a portion of the strip prisms 120 may have protruding structures 130 disposed thereon, and the protruding structures 130 are not disposed on the other portion of the strip prisms. In the embodiment of the invention, the protruding structures 130 are transparent protruding structures 130, for example. Each of the protruding structures 130 has two wing portions 132 respectively disposed on two prism surfaces 122 of the corresponding strip prism 120. A junction of the two wing portions 132 forms a protruding end 134 protruding from the crest line 121 of the corresponding strip prism 120. Each of the wing portions 132 extends from the protruding end 134 to the valley line 123, and protrudes from the corresponding prism surface 122 and the valley line 123. In the embodiment, the protruding structures 130 and the strip prisms 120 are integrally formed, whereas the strip prisms 120 and the light transmissive substrate 110 are formed individually. However, in other embodiments of the invention, the protruding structures 130, the strip prisms 120, and the light transmissive substrate 110 may also be integrally formed. Alternatively, the protruding structures 130 and the strip prisms 120 may be formed individually.

Since the brightness enhancement sheet 100 of the embodiment has protruding structures 130 protruding from the crest line 121 of the strip prisms 120, a regularity of the crest line 121 and a height uniformity of the strip prisms 120 may be broken. Accordingly, a moiré phenomenon generated by the brightness enhancement sheet 100 with other optical devices (e.g., a liquid crystal panel on the brightness enhancement sheet 100) may be reduced, and a local adherence phenomenon produced by the brightness enhancement sheet 100 with other optical devices (e.g., other optical films or liquid crystal panels) may be prevented. Therefore, a light source module adopting the brightness enhancement sheet 100 of the embodiment may provide an uniform surface light source. Moreover, a display apparatus (e.g., an LCD apparatus) adopting the brightness enhancement sheet 100 of the embodiment may provide a display image with a preferable quality. Furthermore, because the protruding structures 130 also protrude from the valley line 123 and the prism surfaces 122, a regularity of the valley line 123 and the prism surfaces 122 may also be broken. Thereby, the moiré phenomenon may be reduced, and the uniformity of the surface light source provided by the light source module, as well as the display quality of the image provided by the display apparatus may be enhanced.

In the embodiment of the invention, a surface 135 of the protruding end 134 is rounded, such that the protruding end 134 is prevented from damaging or scratching other optical devices (e.g., other optical films or display panels). Moreover, the protruding end 134 protrudes from the crest line 121. In other words, a height of the protruding end 134 in a direction perpendicular to the second surface 114 is higher than the crest line 121. Therefore, the junction of two prism surfaces 122 (e.g., at the crest line 121) forming the sharp corner that may scrape or scratch the adjacent optical devices (e.g., other optical films or display panels) may be prevented. In the embodiment, a highest point of the protruding end 134 is higher than the crest line 121 by 1 micrometer or more.

Moreover, in the embodiment, the protruding structures 130 are disposed separately from each other, and a distance between each of the two adjacent protruding structures 130 is at least partially different from another. For example, a distance P1 between two adjacent protruding structures 130 is not equal to a distance P2 between another two adjacent protruding structures 130. Accordingly, the regularity of the protruding structures 130 may be reduced, so as to lower the moiré phenomenon, and furthermore, the uniformity of the surface light source provided by the light source module, as well as the display quality of the image provided by the display apparatus may be enhanced. In one embodiment of the invention, the distance between each of the two adjacent protruding structures 130 may be a random number, in order to further reduce the regularity of the protruding structures 130. In the embodiment, a distance between the highest points of any two adjacent protruding structures is 50 micrometers or more.

Figure 2:
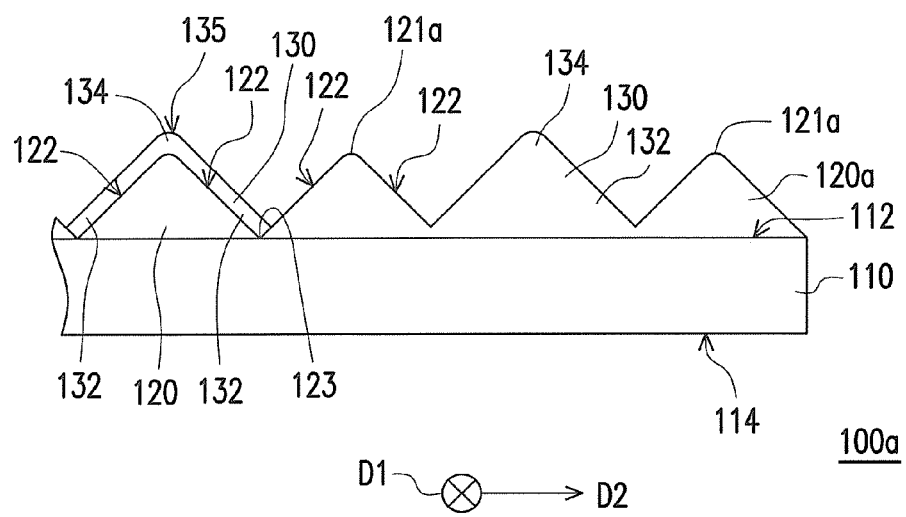
FIG. 2 is a cross-sectional view of a brightness enhancement sheet in accordance with another embodiment of the invention.

Referring to FIG. 2, a brightness enhancement sheet 100a of the embodiment is similar to the brightness enhancement sheet 100 depicted in FIG. 1B. The differences between the brightness enhancement sheet 100 and the brightness enhancement sheet 100a are described below. In the brightness enhancement sheet 100a according to the embodiment, a junction (e.g., at a crest line 121a) of the two prism surfaces 122 of a strip prism 120a fauns a rounded chamfer, thereby further reducing a possibility of the strip prism 120a scraping or scratching the adjacent optical device.

Figure 3A:
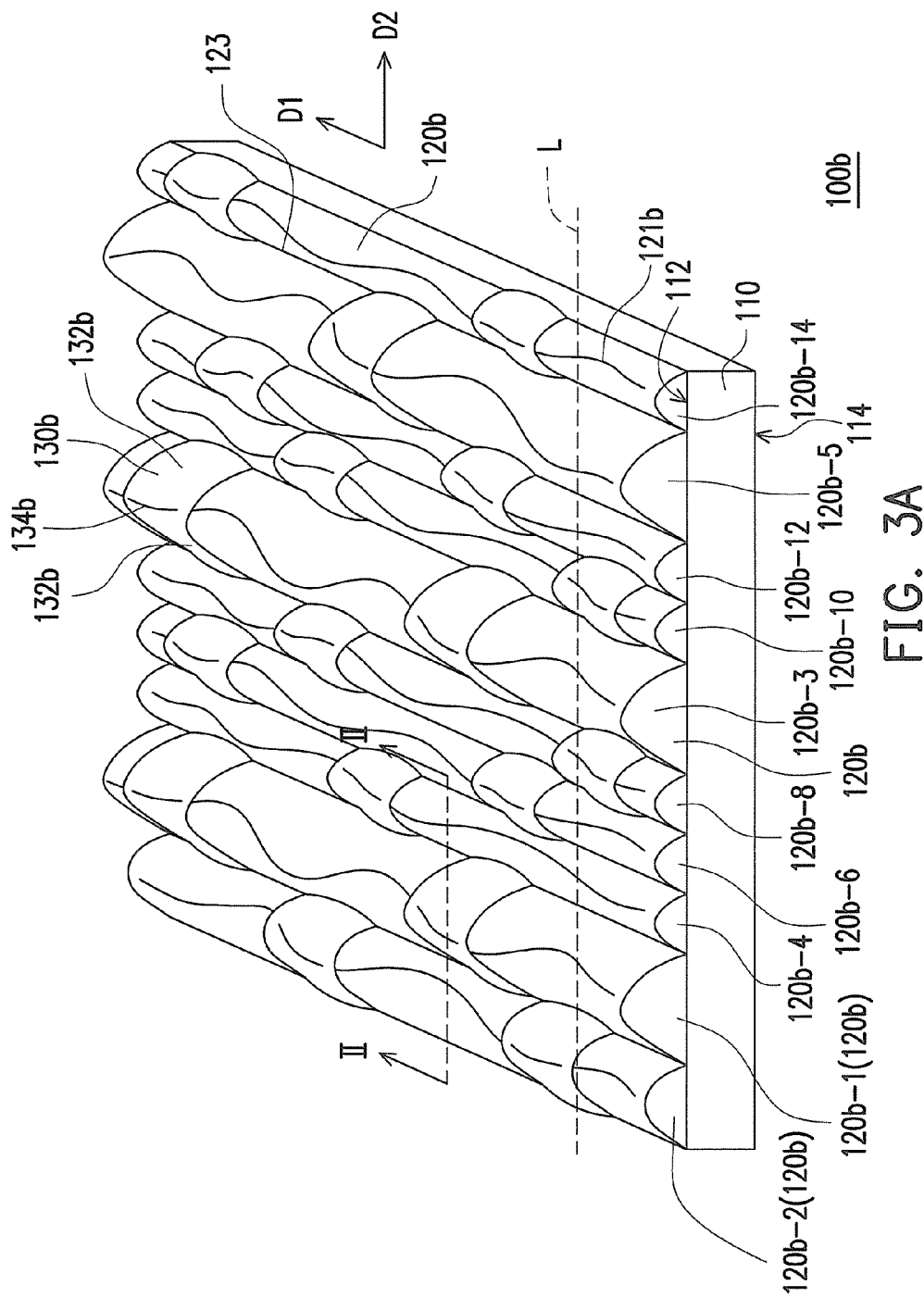
FIG. 3A is a perspective view of a brightness enhancement sheet in accordance with another embodiment of the invention.
Figure 3B:
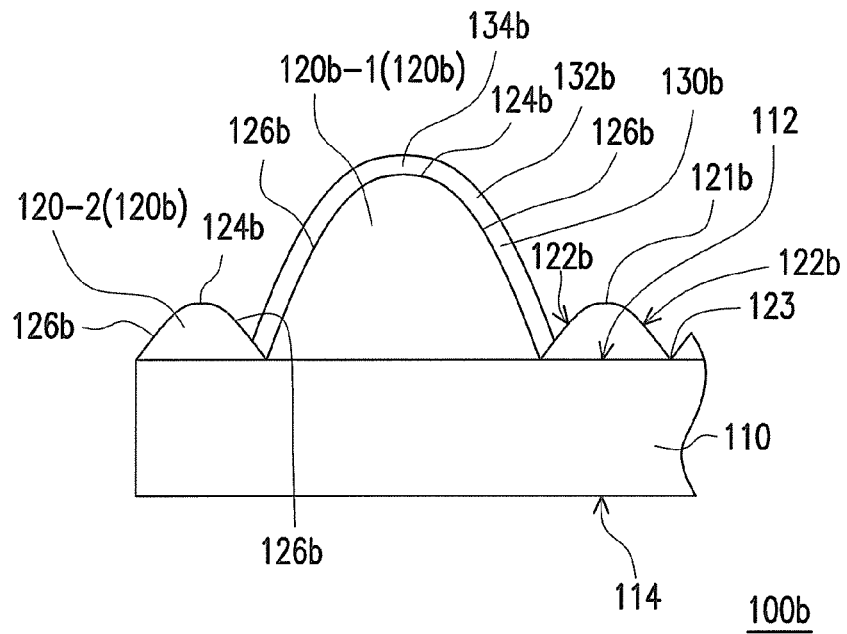
FIG. 3B is a cross-sectional view taken along a line II-II of the brightness enhancement sheet depicted in FIG. 3A.

Referring to FIGS. 3A and 3B, a brightness enhancement sheet 100b of the embodiment is similar to the brightness enhancement sheet 100 depicted in FIG. 1A. The differences between the brightness enhancement sheet 100 in FIG. 1A and the brightness enhancement sheet 100b are described below. In the brightness enhancement sheet 100b of the embodiment, a crest line 121b of one of a plurality of strip prisms 120b rises and falls in a direction close to and farther away from the light transmissive substrate 110. For example, the crest line 121b of the strip prisms 120b rises and falls in a direction perpendicular to the second surface 114, and the crest line 121b rises and falls along an extended direction (e.g., the first direction D1) of the strip prisms 120b. Accordingly, the local adherence phenomenon produced by the brightness enhancement sheet 100b with other optical devices (e.g., other optical films or liquid crystal panels) may be prevented. Therefore, a light source module adopting the brightness enhancement sheet 100b may provide an uniform surface light source. Moreover, a display apparatus (e.g., an LCD apparatus) adopting the brightness enhancement sheet 100b may provide a display image with a preferable quality.

Furthermore, in the embodiment of the invention, any cross-section of the strip prisms 120b perpendicular to the extended direction thereof (e.g., the first direction D1) has a curved top portion 124b and two curved sides 126b. A radius of curvature of the curved top portion 124b is not equal to a radius of curvature of the curved sides 126b. In the embodiment of the invention, the radius of curvature of the curved top portion 124b is smaller than the radius of curvature of the curved sides 126b. Moreover, the curved top portion 124b and the curved sides 126b are protruding out of the strip prisms 120b. However, in other embodiments of the invention, the curved top portion 124b may also be replaced by a sharp corner, and the curved sides 126b may be replaced by linear sides.

Moreover, in the embodiment of the invention, an average height of the strip prisms 120b in a direction perpendicular to the second surface 114 is at least partially different from another. For example, the average height of the strip prism 120b-1 is higher than the average height of the strip prism 120b-2. Accordingly, the possibility of the adherence phenomenon may be further lowered. Similar to the embodiment illustrated in FIGS. 1A and 1B, according to the embodiment, the wing portions 132b of the protruding structures 130b are also extended from the protruding end 134b to the valley line 123. The protruding end 134b protrudes from the crest line 121b, and the wing portions 132b protrudes from the prism surfaces 122b of the strip prisms 120b and the valley line 123. However, in other embodiments of the invention, the wing portions 132b may also extend from the protruding end 134b to the prism surfaces 122b, but not to the valley line 123.

In the embodiment of the invention, each of the protruding structures 130b is disposed on a peak of the crest line 121b away from the light transmissive substrate 110. However, in other embodiments of the invention, at least a portion of the protruded structures may also be disposed on a valley of the valley line close to the light transmissive substrate.

In the embodiment of the invention, largest heights of the strip prisms 120b in a cross-section (e.g., a cross-section cut along a reference line L depicted in FIG. 3A and along a direction perpendicular to the second surface 114) are alternately higher and lower than the average heights of the respective strip prisms 120b. Moreover, the cross-section is not parallel to the extended direction (e.g., the first direction D1) of the strip prisms 120b. The average height of each of the strip prisms 120b refers to an average distance from the crest line 121b on the respective strip prism 120b to the second surface 114. In the embodiment of the invention, the cross-section is substantially perpendicular to the extended direction of the strip prisms 120b. Specifically, a cross-section cut along the reference line L is formed in sequence, from the left to right, by a plurality of strip prisms 120b-2, 120b-1, 120b-4, 120b-6, 120b-8, 120b-3, 120b-10, 120b-12, 120b-5, and 120b-14. Moreover, the cross-sections of the strip prisms 120b are respectively and alternately close to the peak and the valley of the respective crest lines 121b. In the embodiment of the invention, a cross-section of the strip prism 120b-2 is in proximity to the peak of the crest line 121b of the strip prism 120b-2. Therefore, the largest height of the cross-section is higher than the average height of the strip prism 120b-2. A cross-section of the strip prism 120b-1 is close to the valley of the crest line 121b of the strip prism 120b-1. Therefore, the largest height of the cross-section of the strip prism 120b-1 is lower than the average height of the strip prism 120b-1. Moreover, a cross-section of the strip prism 120b-4 is in proximity to the peak of the crest line 121b of the strip prism 120b-4. Therefore, the largest height of the cross-section of the strip prism 120b-4 is higher than the average height of the strip prism 120b-4. A similar description may be given for other strip prisms 120b. Moreover, in the embodiment of the invention, for a plurality of cross-sections parallel to the reference line L, the cross-sections of different prisms are respectively in proximity to the peak or valley of the crest line thereof. Furthermore, the cross-sections of different prisms are alternately close to the peak and the valley. Therefore, the moiré and the adherence phenomenons may be further suppressed.

In the embodiment, at least a strip prism 120b with an average height that is non-local-maximum value is disposed between any two adjacent strip prisms 120b with average heights that are local maximum values. For example, respective average heights of the strip prisms 120b-1, 120b-3, and 120b-5 are local maximum values, whereas respective average heights of the strip prisms, 120b-2, 120b-4, 120b-6, 120b-8, 120b-10, 120b-12, and 120b-14 are non-local-maximum values. Moreover, the strip prisms 120b-4, 120b-6, and 120b-8 with respective average heights that are non-local-maximum values are disposed between the strip prisms 120b-1 and 120b-3 with respective average heights that are local maximum values. Furthermore, the strip prisms 120b-10 and 120b-12 with respective average heights that are non-local-maximum values are disposed between the strip prisms 120b-3 and 120b-5 with respective average heights that are local maximum values. Accordingly, the adherence phenomenon may be further suppressed.

Figure 4:
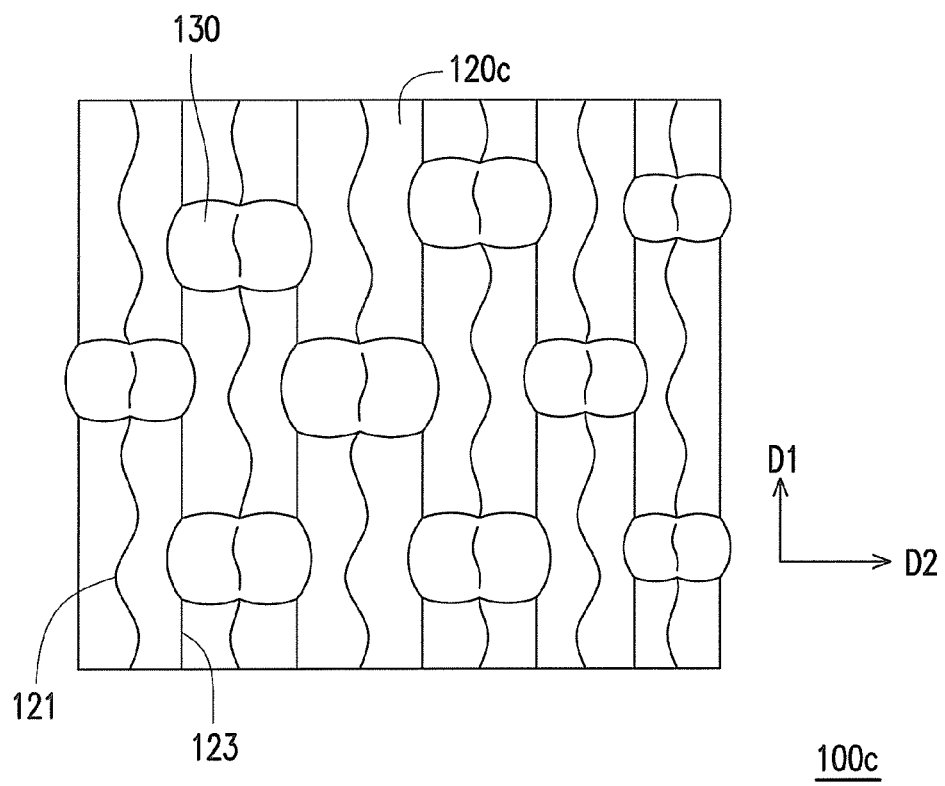
FIG. 4 is a top view of a brightness enhancement sheet in accordance with another embodiment of the invention.

Referring to FIG. 4, a brightness enhancement sheet 100c of the embodiment is similar to the brightness enhancement sheet 100 depicted in FIG. 1A. The differences between the brightness enhancement sheet 100 in FIG. 1A and the brightness enhancement sheet 100c are described below. In the brightness enhancement sheet 100c of the embodiment, the crest line 121 of the strip prisms 120c is curving left and right in a direction parallel (e.g., a direction parallel to the plane of the figure) to a second surface (e.g., the second surface 114 depicted in FIG. 1A). Accordingly, the moiré phenomenon may be effectively suppressed.

In the embodiment of the invention, the valley line 123 is still linear. However, in other embodiments, the valley line 123 may also be curving left and right in a direction parallel to the second surface 114. Additionally, in another embodiment of the invention, besides the crest line of the strip prisms curving left and right as shown in FIG. 4, the crest line may also rise up and down as shown in FIG. 3A. It should be understood that the crest line 121b depicted in FIG. 3A merely rises up and down but does not curve left and right. Moreover, the valley line may merely rises up and down but not curve left and right, or alternatively, the valley line may both rises up and down and curve left and right. Furthermore, in the embodiment, the rising and falling or the curvature variation of the crest line of the strip prisms may have a consistency or not.

In summary, the embodiments of the invention may have at least one of the following advantages. Since the brightness enhancement sheet of the embodiments of the invention has protruding structures protruding from the crest line of the strip prisms, the regularity of the crest line and the height uniformity of the strip prisms may be broken. Accordingly, the moiré phenomenon generated by the brightness enhancement sheet with other optical devices may be reduced, and the local adherence phenomenon produced by the brightness enhancement sheet with other optical devices may also be prevented. Therefore, a light source module adopting the brightness enhancement sheet of embodiments of the invention may provide an uniform surface light source. Moreover, a display apparatus adopting the brightness enhancement sheet of embodiments of the invention may provide a display image of a preferable quality. Furthermore, the surface of the protruding end of the protruding structures may be rounded, thereby reducing the possibility of the brightness enhancement sheet scraping or scratching the adjacent optical devices.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:
1. A brightness enhancement sheet, comprising:
a light transmissive substrate having a first surface and a second surface opposite to the first surface;
a plurality of strip prisms disposed on the first surface, wherein each of the strip prisms has two prism surfaces, a junction of the two prism surfaces forms a crest line, and a valley line is formed between each of the two adjacent strip prisms; and
a plurality of protruding structures disposed on at least a portion of the strip prisms, wherein each of the protruding structures has two wing portions respectively disposed on two prism surfaces of the corresponding strip prism, a junction of the two wing portions forms a protruding end, the protruding end protrudes from the crest line of the corresponding strip prism, each of the wing portions extends from the protruding end to the valley line and protrudes from the corresponding prism surface and the valley line.

2. The brightness enhancement sheet as claimed in claim 1, wherein a surface of the protruding end is rounded.

3. The brightness enhancement sheet as claimed in claim 1, wherein the junction of the two prism surfaces of the strip prisms forms a sharp corner.

4. The brightness enhancement sheet as claimed in claim 1, wherein the junction of the two prism surfaces of the strip prisms fauns a rounded chamfer.

5. The brightness enhancement sheet as claimed in claim 1, wherein the crest line of the strip prisms rises up and down in a direction close to and away from the light transmissive substrate.

6. The brightness enhancement sheet as claimed in claim 5, wherein the crest line of the strip prisms curves left and right in a direction parallel to the second surface.

7. The brightness enhancement sheet as claimed in claim 1, wherein the crest line of the strip prisms curves left and right in a direction parallel to the second surface.

8. The brightness enhancement sheet as claimed in claim 1, wherein the protruding structures are disposed separately from each other, and a distance between each of the two adjacent protruding structures is at least partially different from another.

9. A brightness enhancement film, comprising:
a light transmissive substrate having a first surface and a second surface opposite to the first surface; and
a plurality of strip prisms disposed on the first surface, wherein each of the strip prisms has a crest line rising up and down in a direction close to and away from the light transmissive substrate, the crest line rises up and down relative to an extended direction of the strip prisms, any one of the cross-sections of the strip prisms perpendicular to the extended direction has a curved top portion and two curved sides, a radius of curvature of the curved top portion is not equal to a radius of curvature of the curved sides, and an average height of the strip prisms in a direction perpendicular to the second surface is at least partially different from another.

10. The brightness enhancement film as claimed in claim 9, further comprising a plurality of protruding structures disposed on at least a portion of the strip prisms, wherein each of the protruding structures protrudes from the crest line.

11. The brightness enhancement film as claimed in claim 9, wherein a valley line is formed between each of the two adjacent strip prisms, each of the strip prisms has two prism surfaces, a junction of the two prism surfaces forms the crest line, each of the protruding structures has two wing portions, the two wing portions are respectively disposed on the two prism surfaces of the corresponding strip prism, a junction of the two wing portions forms a protruding end, the protruding end protrudes from the crest line of the corresponding strip prism, each of the wing portions extends from the protruding end to the valley line, and each of the wing portions protrudes from the corresponding prism surface and the valley line.

12. The brightness enhancement film as claimed in claim 9, wherein each of the protruding structures is disposed on a peak of the crest line away from the light transmissive substrate.

13. The brightness enhancement film as claimed in claim 9, wherein largest heights of the strip prisms in a cross-section are alternately higher and lower than average heights of the respective strip prisms, and the cross-section is not parallel to an extended direction of the strip prisms.

14. The brightness enhancement film as claimed in claim 9, wherein at least a strip prism with an average height of non-local-maximum value is disposed between any two adjacent strip prisms with average heights of local maximum values.

15. The brightness enhancement sheet as claimed in claim 9, wherein the crest line of the strip prisms curves left and right in a direction parallel to the second surface.

16. The brightness enhancement sheet as claimed in claim 9, wherein a surface of the protruding end is rounded.

17. The brightness enhancement sheet as claimed in claim 9, wherein the protruding structures are disposed separately from each other, and a distance between each of the two adjacent protruding structures is at least partially different from another.

* * * * *